(12) United States Patent
Friesen

(10) Patent No.: US 6,430,908 B1
(45) Date of Patent: Aug. 13, 2002

(54) SELF-LEVELING HITCH AND CLEVIS ASSEMBLY

(75) Inventor: Henry Friesen, Niagara Falls (CA)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/709,002

(22) Filed: Nov. 8, 2000

(51) Int. Cl.[7] .......................... A01D 34/03; A01B 59/00
(52) U.S. Cl. .................... 56/218; 56/15.9; 56/DIG. 14; 172/677; 172/679
(58) Field of Search ................................ 56/14.7, 15.2, 56/15.5, 15.7, 15.8, 15.9, 228, DIG. 14, 218, 14.9; 172/248, 272, 313, 328, 417, 677, 679, 680; 280/416.1, 416.2, 492, 515, 511; 403/79

(56) References Cited

U.S. PATENT DOCUMENTS

| | | | | |
|---|---|---|---|---|
| 2,821,831 A | * | 2/1958 | Thompson | 56/15.7 |
| 3,977,532 A | * | 8/1976 | Hackman | 213/208 |
| 3,998,471 A | | 12/1976 | Lutchemeier | |
| 4,126,328 A | * | 11/1978 | Old | 172/248 |
| 4,502,546 A | * | 3/1985 | Moos | 172/311 |
| 4,684,280 A | * | 8/1987 | Dirkin et al. | 403/79 |
| 4,926,621 A | * | 5/1990 | Torras | 56/15.8 |
| 5,062,489 A | * | 11/1991 | Adee | 172/311 |
| 5,386,680 A | | 2/1995 | Friesen | |
| 5,536,032 A | * | 7/1996 | Golson, Jr. et al. | 280/492 |
| 5,918,451 A | * | 7/1999 | Vonesch | 56/365 |
| 6,142,500 A | * | 11/2000 | Sargent | 280/511 |
| 6,272,826 B1 | * | 8/2001 | Menichetti et al. | 56/367 |

* cited by examiner

Primary Examiner—Thomas B. Will
Assistant Examiner—Nathan Mammen

(57) ABSTRACT

A rotary cutter includes a hitch comprising upper and lower arm sections which define a parallel linkage extending between the deck of the rotary cutter and a ball clevis forming a forward end of the hitch. The ball clevis includes identical upper and lower halves which include block-like rear portions that are clamped together so that a ball is releasably retained between ring-like front portions of the clevis. Leveling of the deck is accomplished by a pair of adjustable leveling mechanism respectively coupled between rear parts of the separate arm sections and the deck. Provision is made for mounting a jack stand to one side of the clevis and for storing the jack stand on the deck.

4 Claims, 5 Drawing Sheets

SELF-LEVELING HITCH AND CLEVIS ASSEMBLY

The present invention relates to hitches for towed implements and more specifically a relates to self-leveling hitch and clevis arrangements adapted for being hitched to a tractor drawbar.

BACKGROUND OF THE INVENTION

Tractor drawn implements, of which a pull-type rotary cutter is one example, require the implement hitch to be coupled to the tractor drawbar in such a way as to allow for rotation in three directions (turning, twisting and pitching). To accommodate pitching, a horizontal pivot is required which in turn allows the clevis to hang down resulting in chucking and excessive clevis/drawbar wear. Chucking can also cause premature driveline failures. Two examples of designs which attempt to address these problems are respectively disclosed in U.S. Pat. No. 3,998,471 granted to Luchemeier on Dec. 21, 1976, and in U.S. Pat. No. 5,386,680 granted to Friesen on Feb. 7, 1995.

On some cutters, a link is pivotally attached between the mower deck and the clevis so as to form a parallel linkage with the hitch, thus resulting in the clevis being self-leveling as the cutter is raised and lowered, but this system does not allow for rotation during twisting or pitching except for the clearance between the drawbar pin and the slots in the clevis. With self-leveling, the clevis still rotates on the drawbar resulting in drawbar wear.

SUMMARY OF THE INVENTION

According to the present invention, there is provided an improved hitch and clevis assembly which overcomes the drawbacks associated with prior art hitch and clevis assemblies.

A object of the invention is to provide a self-leveling levis which does not include a separate link for keeping the clevis level.

A more specific object of the invention is to provide a hitch that has separate arms that are coupled between the towed implement frame and the clevis so as to define a parallel linkage that maintains the clevis in a level attitude.

Yet another object of the invention is to provide a hitch and self-leveling clevis assembly which operates such as to permit the clevis to rotate in three directions at its connection with the drawbar.

A further specific object of the invention is to provide a hitch and self-leveling clevis assembly, as set forth in the immediately preceding object, wherein the clevis includes upper and lower halves having opposed surfaces shaped complementary to and engaging a hitch ball containing a vertical hitch pin receiving hole and a horizontal opening adapted for receiving the drawbar of a tractor, whereby the ball provides a surface on which the clevis is pivotable in three directions.

These and other objects will become apparent from a reading of the ensuing description together with the appended drawings.

DESCRIPTION OF THE PREFERRED EMBODIMENT

Figure 1:
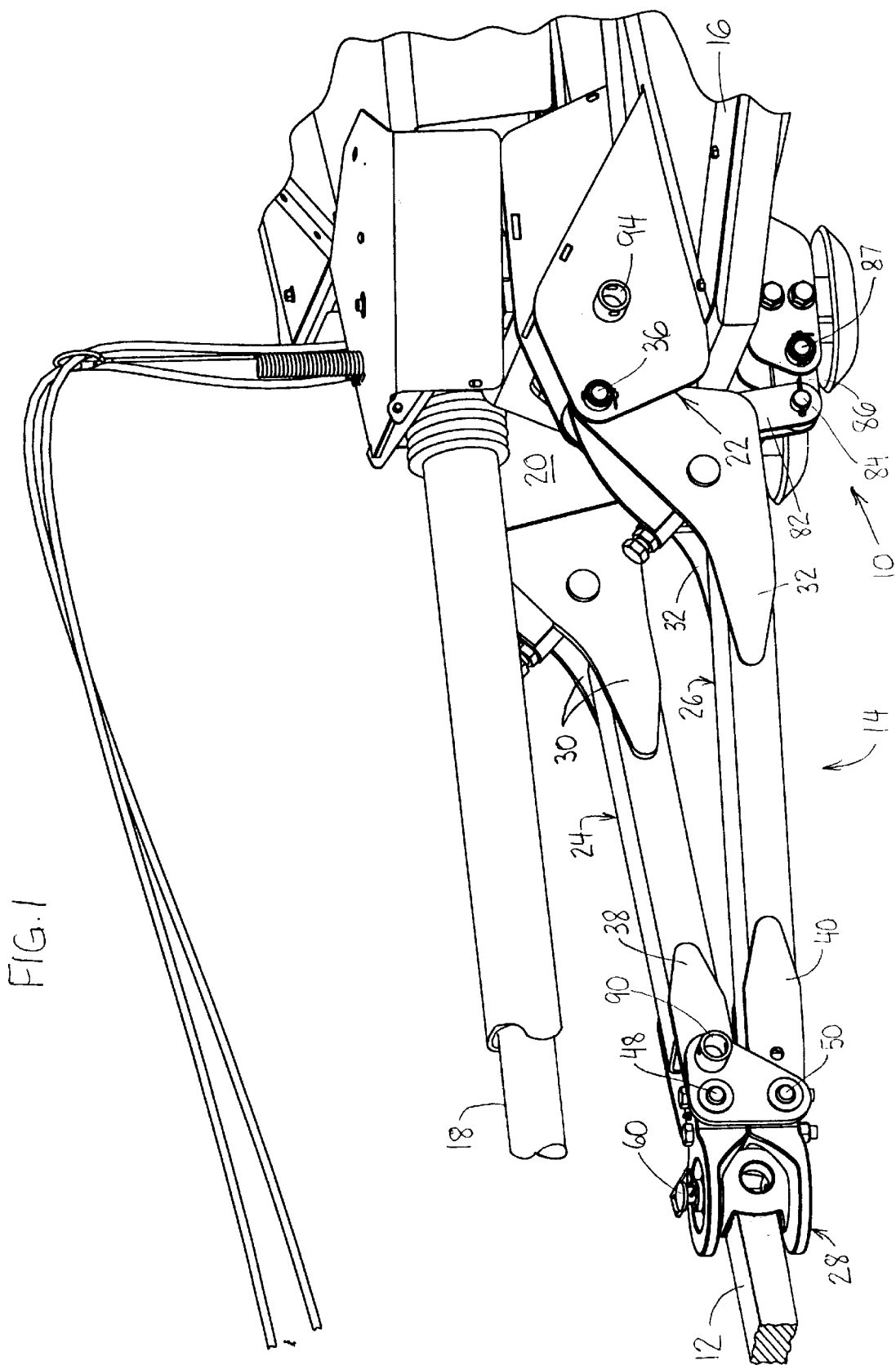
FIG. 1 is a left side perspective view, looking slightly downwardly, of the self-leveling hitch extending between a tractor drawbar and the front of a rotary cutter deck.

Referring now to FIG. 1, there is shown a front portion of a towed implement, here shown as a rotary cutter 10, a drawbar 12 of a tractor (not shown) and a cutter hitch 14 coupling the cutter 10 to the drawbar 12. Provided for transmitting power from a power takeoff shaft (not shown), at a rear location of the tractor and an input shaft (not shown) of a gear box carried at a top location of a deck 16 of the rotary cutter 10 for distributing power for driving cutter blades (not shown) is a shielded, telescopic power shaft 18.

Right-and left-hand, transversely spaced, upright hitch mounting brackets 20 and 22, each in the form of transversely spaced parallel plates, are welded to respective upper front locations of the cutter deck 16 located equidistant from a longitudinal, vertical center plane of the rotary cutter 10. The hitch 14 includes separate upper and lower arm sections 24 and 26, respectively, having their respective rear ends vertically pivotally coupled to the brackets 20 and 22, and from which the arm sections converge forwardly (see also FIG. 5) to a ball clevis 28 to which forward ends of the arm sections are individually pivotally coupled.

Figure 2:
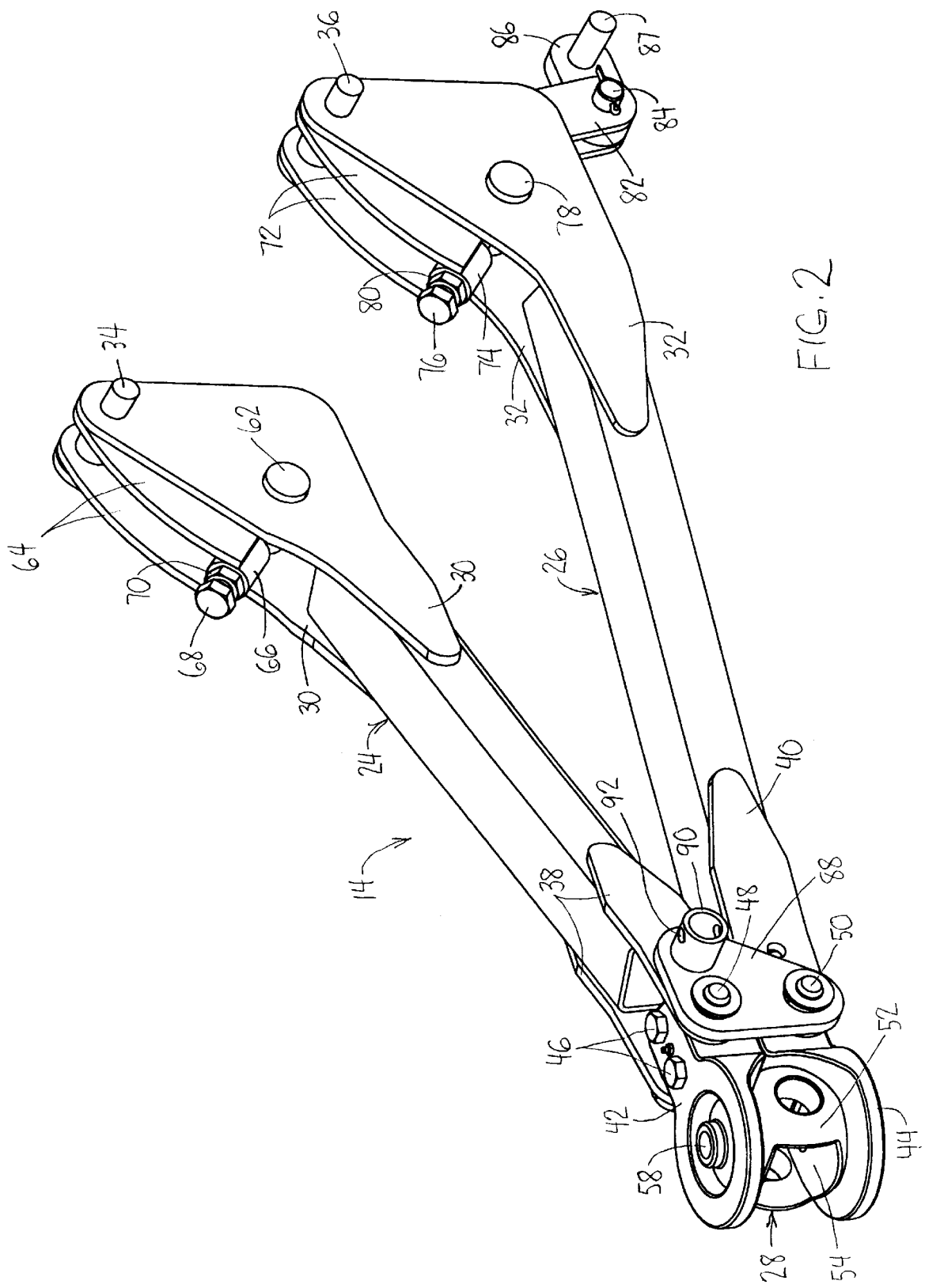
FIG. 2 is a left front perspective view of the hitch.
Figure 3:
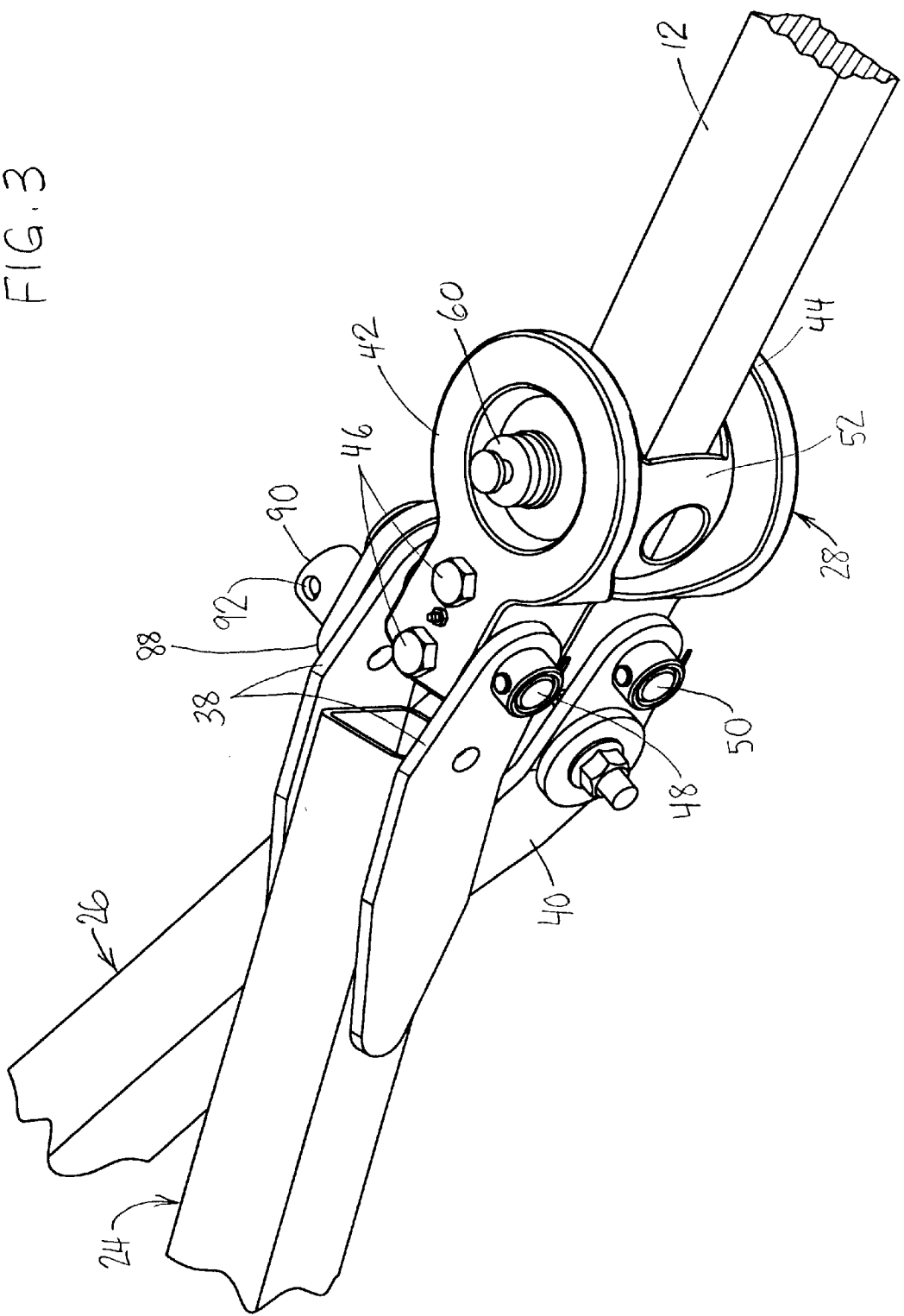
FIG. 3 is a right side perspective view of the front end of the hitch showing the ball clevis coupled to the tractor drawbar.

Specifically, referring now also to FIG. 2, it can be seen that the rear ends of the arm sections 24 and 26 are defined by respective rear connecting portions 30 and 32, each being in the form of a pair of transversely spaced, vertical, generally triangular plates. The connecting portion 30 is received between, and has an upper rear corner pivotally connected, as by a transverse mounting pin 34, to an upper forward location of the plates of the hitch mounting bracket 20. Similarly, the connecting portion 32 is received between and has an upper rear corner pivotally connected, as by a transverse mounting pin 36, to an upper forward location of the plates of the hitch mounting bracket 22. Referring now also to FIG. 3, it can be seen that the forward ends of the arm sections 24 and 26 are defined by respective front connecting portions 38 and 40, each of which are in the form of a pair of transversely spaced straps, with the straps of the connecting portion 38 being disposed above, and in vertical alignment with, the straps of the connecting portion 40. The clevis 28 is made of identical, upper and lower halves 42 and 44, respectively, having ring-like forward ends and block-like rear ends. The clevis halves 42 and 44 are clamped to each other by a pair of fore-and-aft spaced bolts 46 extending vertically through the block-like rear ends. The straps of the front connecting portion 38 of the upper arm section 24 straddle, and are pivotally coupled to the block-like rear end of the upper clevis half 42 by a horizontal pivot pin 48 located in a bore located in the clevis half 42 between the spaced bolts 46. Similarly, the straps of the front connecting portion 40 of the lower arm section 26 straddle, and are pivotally coupled to, the block-like rear end of the lower clevis half 44 by a horizontal pivot pin 50 spaced vertically below the pivot pin 48. It is here noted that the left-hand end of each of the pins 48 and 50 includes a head defined by a washer welded to the stem of the pin.

Figure 4:
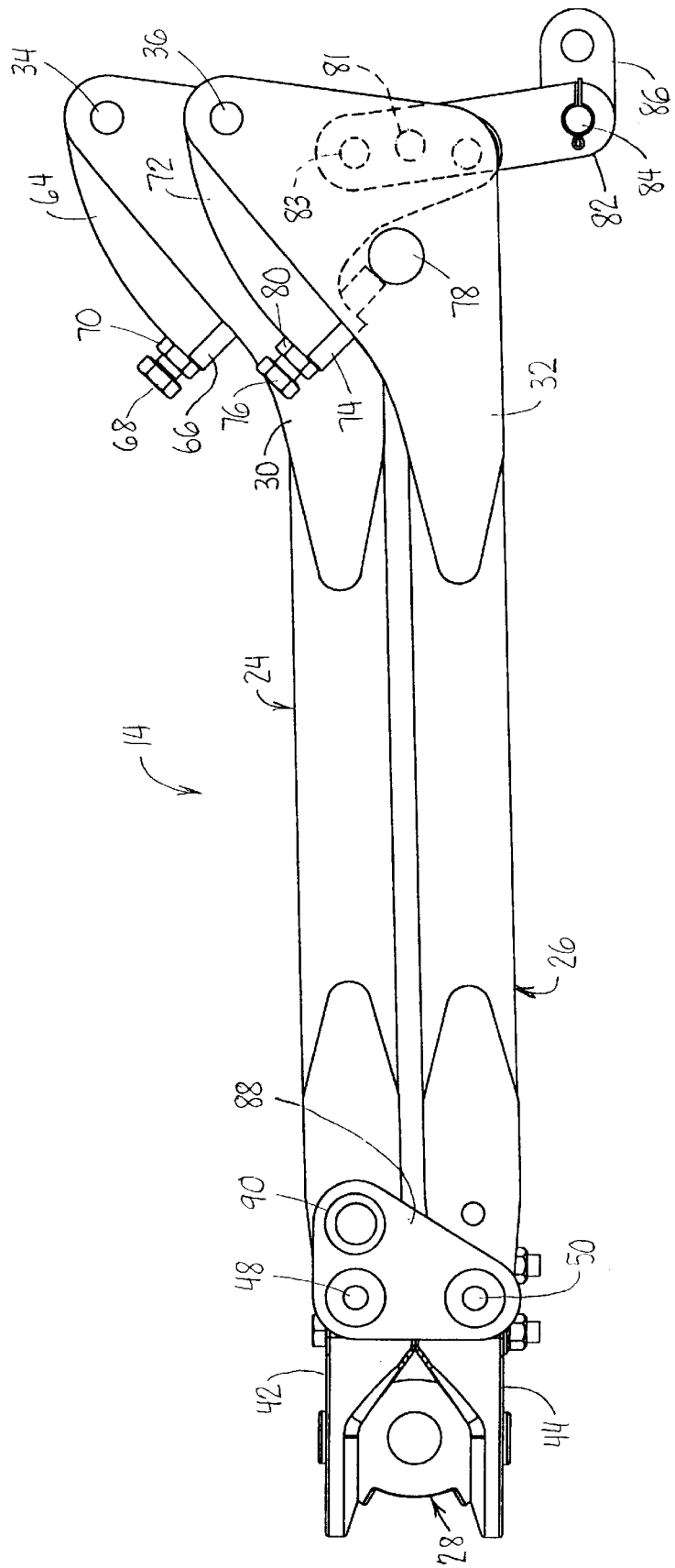
FIG. 4 is a left side view of the self-leveling hitch.

As can best be seen in FIG. 4, the pivot pins 34 and 36, respectively, for coupling the rear ends of the upper and lower arm sections 24 and 26 to the hitch supports 20 and 22, are spaced vertically from each other by the same distance that the pivot pins 48 and 50, respectively coupling the front ends of the arm sections to the clevis halves 42 and 44, are spaced from each other. Thus, it will be appreciated that the separate arm sections 24 and 26 form a parallel linkage which results in the clevis 28 remaining level throughout the vertical pivoting of the arm sections 24 and 26 during operation of the rotary cutter 10 over uneven terrain.

Referring once again to FIGS. 2 and 3, it can be seen that the ring-shaped forward ends of the clevis halves 42 and 44 are respectively engaged with top and bottom portions of a ball 52. The clevis halves 42 and 44 are provided with respective spherically shaped surface portions (not shown) that are complementary to respective outer surface portions of the ball 52 so that the ball is captured by the clevis halves but is gripped loose enough that the clevis halves slide upon the ball surface. The ball 52 contains an opening 54 which is rectangular in cross section and receives the rear portion of the tractor drawbar 12. The drawbar 12 is provided with a vertical hole which is aligned with a vertical hole 58 extending through the ball 52, with a hitch pin 60 being received in these aligned holes so as to connect the hitch 14 to the tractor and to provide a vertical axis about which the hitch 14 may pivot.

Figure 5:
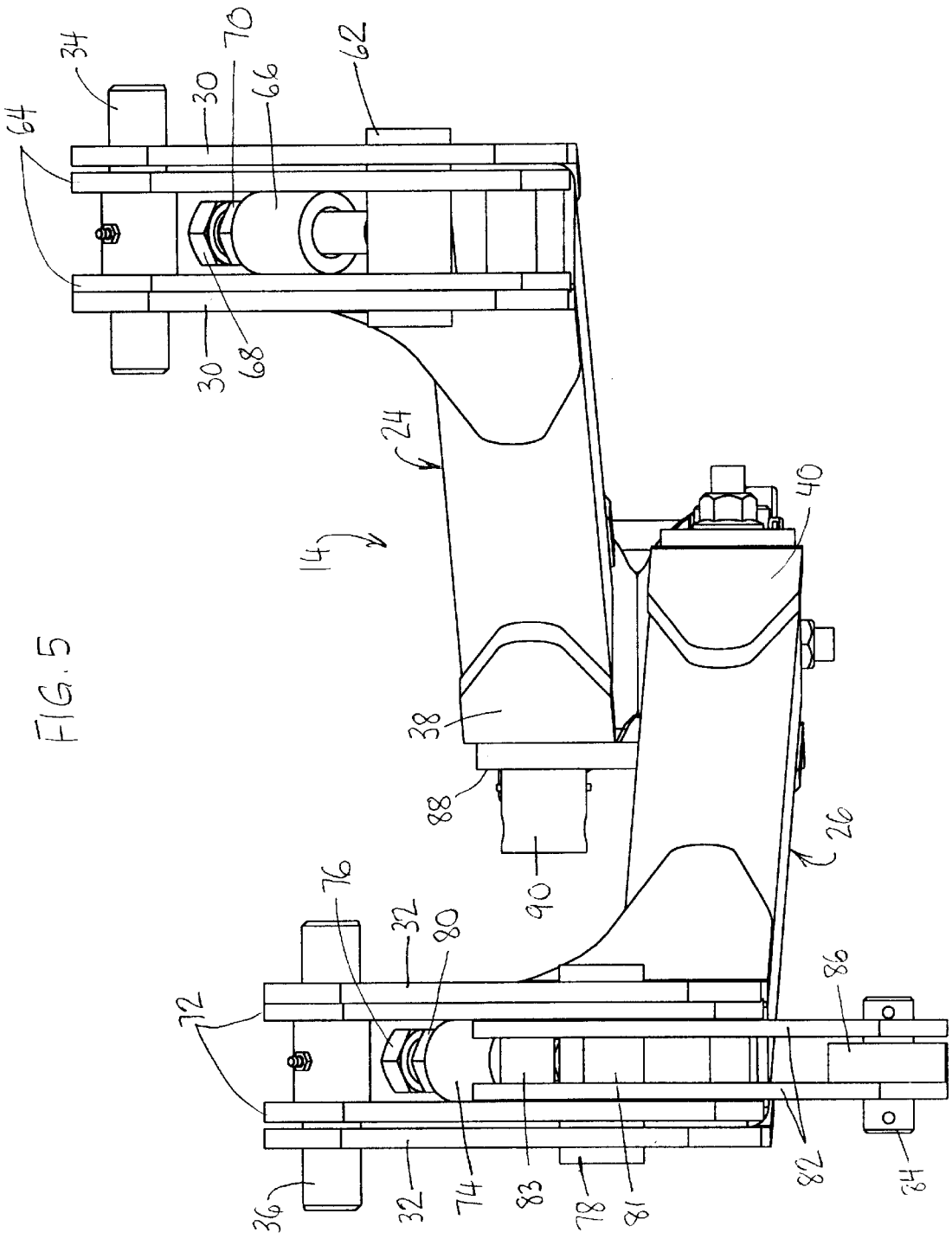
FIG. 5 is a rear view of the self-leveling hitch.

Referring now to FIGS. 1, 2 and 5, there is shown structure for effecting raising or lowering of the clevis 28, for accommodating tractor drawbars of different heights, by individually inducing a force for lifting or lowering the arm sections 24 and/or 26 about the pivot pins 48 and 50. Specifically, extending horizontally between and welded to the straps making up the connecting portion 30 of the upper hitch arm section 24 is a rod which defines a stop 62. A bell crank 64, in the form of a pair of parallel, generally triangular plates, has a first corner mounted for pivoting about the pivot pin 34 and includes a front corner with the plates straddling and being welded to a threaded cylindrical tube 66, which receives a cap screw 68 having its lower end engaged with the stop 62. A jam nut 70 is received on the screw 68 for holding the latter in a desired position of adjustment. The bell crank 64 has a lower rear corner pivotally attached to a clevis forming a forward end of a fore-and-aft extending leveling rod (not shown) having a rear end pivotally attached to a lug fixed to a transverse wheel axle (also not shown) pivotally mounted to a rear location of the deck 16 and held in a desired disposition by a hydraulic motor, or the like. Thus, it will be appreciated that, as viewed in FIG. 2, raising of the hitch 28 from its illustrated position is permitted by withdrawing the screw 68 so as to allow upward movement of the stop 62 about the pin 34, while lowering of the hitch is permitted by advancing the screw 68 so that the stop 62 engages the screw 68 at a lower location.

Similarly, a bell crank 72, in the form of a pair of parallel, generally triangular plates having an upper corner mounted for pivoting about the pivot pin 36, and having a lower front corner arranged with the plates straddling and being welded to a threaded cylindrical tube 74, which receives a cap screw 76 having its lower end engaged with a stop 78 formed by a rod extending horizontally between and welded to the plates forming the connection portion 32 of the lower arm section 26. A jam nut 80 is received on the screw 76 and serves to retain it in a desired adjusted position. A lower rear corner of the bell crank 72 is provided with a pair of vertically spaced holes, one of which receives a pin 81 that is captured between the plates forming the bell crank 72 and pivotally attaches the bell crank to a link 82, which is formed by a pair of parallel straps having upper ends located above the pin 81 and pinned, as at 83, to a clevis forming a forward end of a second leveling rod (not shown) having a rear end coupled to a second lug fixed to the wheel axle at the rear of the deck 16. It is here noted that the pin 83 is captured between the plates forming the bell crank 72 and is located at a level approximately equal to that of the connection of the lower rear end of the bell crank 64 with the leveling rod on that side. The link 82 extends downwardly from the pin 81 and has a lower end pivotally attached, as at a pin 84, to a short link 86 that extends fore-and-aft and has its rear end received between, and pivotally attached, as by a pin 87, to lower projections of the hitch mounting bracket 22. Adjustment of the screw 76 results in the hitch arm section 26, and hence the clevis 28, being raised or lowered in a manner similar to that effected by adjustment of the screw 68, as described above.

When it is desired to unhook the hitch 14 from the tractor drawbar 12, a jack stand (not shown) may be mounted to the clevis 28. For this purpose, a triangular support plate 88, as can best be seen in FIGS. 1, 2 and 4, is mounted to the left-hand side of the clevis 28 by the pins 48 and 50, it being noted that the welded washers defining the heads at the left-hand ends of the pins 48 and 50 serve to retain the plate 88 in place. Welded to a rear corner location of the plate is a jack stand mounting tube 90 which is provided with a cross hole 92 that serves to receive mounting hardware of the jack stand. Of importance is the fact that, due to being mounted on the pins 48 and 50, the plate 88 remains in a constant attitude throughout any vertical adjustments made for accommodating drawbars of different heights, with the tube 90 being oriented such that the jack stand, when coupled to it, has a substantially vertical disposition. A mounting tube 94 (see FIG. 1), similar in construction to the mounting tube 90, is provided on the left-hand plate of the support bracket 22 for the purpose of providing a location for storing the jack stand, in a substantially horizontal orientation, during operation of the rotary cutter 10.

What is claimed is:

1. In a towed implement including a hitch having its rear end pivotally coupled to an implement body and having a clevis at its forward end adapted for connection to a drawbar of a towing vehicle, the improvement comprising: said hitch including upper and lower, separate arm sections each defined by a single member; said upper and lower arm sections having respective rear ends spaced transversely from each other and pivotally attached to the implement body for pivoting about first and second horizontal axes; said upper and lower arm sections converging forwardly with a forward end of said upper arm section being located vertically above a forward end of said lower arm section; and each arm having a front end pivotally attached to the clevis, such that said upper and lower arm sections form a parallel linkage, whereby said hitch together with said clevis is self-leveling.

2. The towed implement defined in claim 1 wherein said clevis is in the form of a ball clevis including a ball provided with a horizontal opening for receiving a tractor draw bar and a vertical hole for receiving a hitch pin for coupling the ball to said tractor drawbar.

3. The towed implement defined in claim 2 wherein said ball clevis includes upper and lower parts respectively defining spherical surface portions engaged with said ball such that the latter is movable relative thereto.

4. The towed implement defined in claim 1 wherein a jack stand mounting structure is pivotally coupled to said clevis together with said upper and lower separate arm sections so as to remain in a constant attitude with said clevis as said arm sections move up and down; and a jack stand mounting structure including a connection arrangement for releasably retaining a jack stand in a substantially vertical orientation.

* * * * *